US011188387B2

(12) United States Patent
Smaldone et al.

(10) Patent No.: US 11,188,387 B2
(45) Date of Patent: Nov. 30, 2021

(54) ADMINISTRATIVE RESOURCE MANAGEMENT QOS FOR STORAGE APPLIANCES

(71) Applicant: EMC IP Holding Company LLC, Hopkinton, MA (US)

(72) Inventors: Stephen D. Smaldone, Woodstock, CT (US); Ian Wigmore, Westborough, MA (US); Arieh Don, Newton, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 186 days.

(21) Appl. No.: 15/965,298

(22) Filed: Apr. 27, 2018

(65) Prior Publication Data

US 2019/0332440 A1 Oct. 31, 2019

(51) Int. Cl.
*G06F 9/46* (2006.01)
*G06F 9/50* (2006.01)
*G06F 11/34* (2006.01)
*H04L 12/24* (2006.01)

(52) U.S. Cl.
CPC ............ *G06F 9/5038* (2013.01); *G06F 9/505* (2013.01); *G06F 9/5083* (2013.01); *G06F 11/3433* (2013.01); *G06F 2209/508* (2013.01); *H04L 41/0893* (2013.01)

(58) Field of Classification Search
CPC ...... G06F 9/5038; G06F 9/505; G06F 9/5083; G06F 11/3433
See application file for complete search history.

(56) References Cited

U.S. PATENT DOCUMENTS

| 7,526,767 | B1* | 4/2009 | Rhee | G06F 9/5061 |
| | | | | 718/104 |
| 2011/0154350 | A1* | 6/2011 | Doyle | G06F 9/5044 |
| | | | | 718/104 |
| 2016/0239230 | A1* | 8/2016 | Sato | G06F 3/06 |
| 2018/0052711 | A1* | 2/2018 | Zhou | G06F 9/46 |
| 2018/0285766 | A1* | 10/2018 | Shen | G06F 11/3419 |
| 2019/0065278 | A1* | 2/2019 | Jeuk | G06F 9/45558 |
| 2019/0116128 | A1* | 4/2019 | Guo | H04L 67/1008 |

* cited by examiner

*Primary Examiner* — Tammy E Lee
(74) *Attorney, Agent, or Firm* — Womble Bond Dickinson (US) LLP

(57) ABSTRACT

Embodiments are described for dynamically allocating and reallocating system resources between production work tasks and administrative tasks using policies. A resource monitor continuously monitors all resources in a computing system, and whether the resources are used for production work or administrative tasks. A policy can define resources needed to execute an administrative task and conditions which can be used to determine whether or not the administrative command is allocated the resources, even at the expense of a negative impact to production work.

21 Claims, 7 Drawing Sheets

| | Policy Attribute | Description |
|---|---|---|
| 501→ | Command | CKFS - check file system |
| 502→ | Quality of service (QoS) | Quality of service _4_ (1-5) |
| 503→ | Group | System health |
| 504→ | Commands in Group | CKFS, check disk structure, etc. |
| 505→ | Command trigger | On request by administrator |
| 506→ | Policy change trigger | On time window |
| 507→ | Completion requirement | 24 hours |
| 510→ | CKFS: POLICY A | Day-time policy |
| 515→ | Hours | _8:00_ am to _6:00_ pm |
| 520→ | Memory | _3 GB_ physical memory |
| 525→ | Processor | 100 μs quantum, schedule priority _3_ (1-5) |
| 530→ | I/O system | _2_ I/O queues, priority _3_ (1-5) |
| 535→ | Defer to | Production work with QoS _4_ (1-5) |
| 540→ | Priority over | Production work with QoS 2 or less (1-5) |
| 550→ | CKFS: POLICY B | Night-time policy |
| 555→ | Hours | _6:00_ pm to _8:00_ am |
| 560→ | Memory | _5 GB_ physical memory |
| 565→ | Processor | 200 μs quantum, schedule priority _4_ (1-5) |
| 570→ | I/O system | _3_ I/O queues, priority _5_ (1-5) |
| 580→ | Defer to | Production work with QoS _5_ or higher (1-5) |
| 585→ | Priority over | Production work with QoS 3 or less (1-5) |

FIG. 5

ADMINISTRATIVE RESOURCE MANAGEMENT QOS FOR STORAGE APPLIANCES

TECHNICAL FIELD

This disclosure relates to the field of resource management in computing devices, including a storage appliance.

BACKGROUND

Today, many products include software delivered utilizing an appliance model (e.g. EMCiDPA, eCDM, Data domain, Cyclone, etc.) One of the key distinguishing features of an appliance model, versus other models, is that, at times, the management software will have to compete with the primary/core software for hardware resources (CPU, RAM, and I/O resources).

There are two traditional solutions that have been used to solve this problem. One solution is to overprovision the hardware, such that there are always resources set aside for the management software use. This solution increases the cost of the storage appliance, but guarantees availability of computing resources to management software regardless of the workload being serviced by the primary/core software. A second approach has been to share resources between the management software and the core/primary software. The drawback with this approach is that under heavy load of production (user) tasks, the management software many not be responsive to administrator requests, or may place too heavy a burden on the system negatively impacting core primary servicing. In some cases, important administrative functions, such as a file system check, may not complete in the required time frame due to a heavy load of user work and insufficient resources to run the administrative functions.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates, in block diagram form, an example policy for implementing administrative resource management QoS on a storage appliance, in accordance with some embodiments.

DETAILED DESCRIPTION

Figure 1:
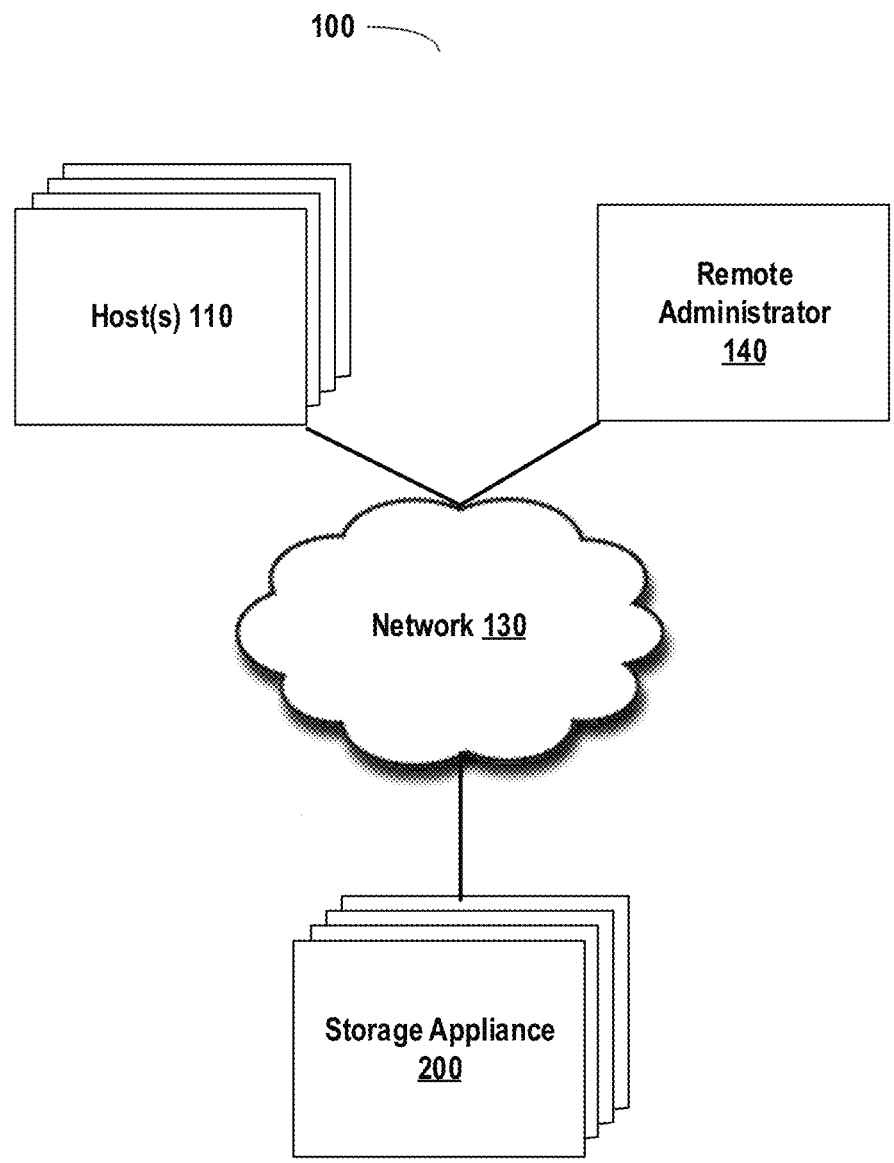
FIG. 1 illustrates, in block diagram form, an overview of a storage area network (SAN) that can implement administrative resource management quality of service (QoS) for storage appliances, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described that allow an administrator to specify a resource allocation policy (or just, "policy") for specific management functions. For example, an administrator may want to give provisioning/configuration functions a low priority so that they do not interfere with primary workload execution. At the same time, the administrator may give high priority to diagnostic functions, so that problems with the storage appliance can be investigated even during even peak user workload times. The QoS scheme also allows for automatically adaptive policies to be applied, for example, based on time-of-day, day-of-week, or health status of the storage appliance, and also allow for an administrator to specify the minimum time to management command initiation.

Embodiments are described for allocating resources in a storage appliance in accordance with an administrative resource management quality of service (QoS) for storage appliances. A storage appliance can perform production (user work) tasks such as reading and writing to and from storage, creating directories, creating and deleting files, searching directories, and the like. An administrator of the storage appliance at times will need to perform administrative tasks on the storage appliance at the same time that users are performing production work on the storage appliance. Administrative tasks can include configuration tasks such as setting up new users, allocating storage to users, configuring or migrating a virtual machine, or other operating environment for the user that provides storage services to the user. Administrative tasks can also include tasks that determine the health and reliability of the storage appliance, such as garbage collection, checking file system integrity, defragmenting a disk, and determining whether one or more disk tracks or sectors are becoming unreliable. Embodiments are disclosed herein for ensuring that resources are efficiently used for both administrative and user workload tasks, and resources are allocated to ensure that critical administrative tasks are timely performed, even at the expense of reducing progress on user work tasks.

A computer-implemented method practiced on a storage appliance computing environment includes receiving a command to perform an administrative task on the storage appliance. A resource monitor monitors resources used by a plurality of user work tasks and the resource monitor. If any administrative tasks are running, resources used by the administrative tasks are also monitored. A policy associated with the received administrative task is determined. The policy specifies, among other things, the resources requested for executing the received administrative task. A resource scheduler dynamically reallocates one or more resources from a work task in the plurality of work tasks to the execution of the received administrative task, in response to a triggering condition of the policy. In an embodiment, the work task includes reading and/or writing data to the storage appliance. In an embodiment, the triggering condition is determining that the administrative task requires a greater quantity of a resource than is available in the computing system, as reported by the resource monitor. In an embodiment, the quantity of the resource(s) required by the administrative task is specified in the policy. The policy can also specify a required completion time for the administrative task. The triggering condition can be that the required completion time is less than a previous completion time for the administrative task. The quantity of resources required for the administrative task can be estimated, based at least in part on the specified completion time, and/or previous completion time, and quantity of the resource previously used to complete the administrative task. While the administrative task is executing the policy up on which the resource requirements were determined can be updated. One or more resources required by the updated policy can be dynamically (re-)allocated to the administrative task in accordance with the updated policy. In an embodiment, in response to determining that the policy indicates that executing of a production work task is a higher priority than executing the administrative task, only as much of the resource will be allocated to the administrative task as is available to the administrative task, regardless of a required quantity of the resource specified for the administrative task in the policy. In an embodiment, a policy can have sub-policies that are to be invoked based up on triggering conditions in the sub-policies. For example, a policy can have a day-time execution sub-policy and a night-time execution sub-policy.

A policy can have a plurality of policy attributes including, but not limited to, quality of service (QoS) attribute, an administrative command trigger, a command group, a policy change trigger, and a completion requirement time. A quality of service attribute can be an ordinal, relative number, e.g. 1 through 5, indicating that 1 is a lower quality of service level than 5. An administrative command trigger can include, "run command now," "defer command until a specified time," "execute command when a specified performance metric is above or below a threshold value," or "execute command when a specified resource metric is above or below a specified value." For example, a policy for an administrative command to defragment a disk may have an attribute to trigger the defragmentation operation when disk seek times are greater than a specified value. A garbage collection command may be executed when available memory is below a specified threshold. An attribute can include a group to which an administrative command belongs. A command group can include, e.g. "configuration" administrative commands, "health/diagnostic" commands, or "performance" administrative commands. A policy can have sub-policies with attributes such has: hours of the day to invoke the sub-policy, an amount of physical memory to allocate to the administrative task, a processor quantum and scheduling priority, a number of input/output (I/O) queues and priority within the queues, a type of work and QoS of work that the administrative task will defer resources to, and a type of work and QoS of work that the administrative task will take priority over. These are just example attributes of a policy. A policy can have attributes that include sub-policy attributes.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. A representative application programming interface is described below with reference to FIG. 6. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview of a system 100 having a storage appliance 200 that can implement administrative resource management quality of service (QoS) for storage appliances, in accordance with some embodiments.

System 100 can include a plurality of hosts 110, a remote administrator computing device 140, and a storage appliance 200, all interconnected by a network 130. A host can be any type of computing device 110, including a desktop personal computer, a server, a laptop computer, a tablet computer, a smart phone, a virtual machine, or other computing device. A representative host computing device 110 is described below with respect to FIG. 7. Host(s) 110 perform storage operations on storage appliance 200. In an embodiment, one or more hosts 110 may be connected to storage appliance 200 by a high-speed bus, a backplane, a USB connection, an Ethernet connection, a wireless connection, or other communication infrastructure and/or communication protocol. Remote administrator 140 can use any type of computing device to access administrative functions of the storage appliance 200. In an embodiment, the remote administrator 140 computing device can be, without limitation, a stand-alone computing device such as a desktop, laptop, or tablet computer, a virtual machine, or other computing device. A representative computing device 110 for administrator 140 is described below with respect to FIG. 7. Network 130 can be any type of network, including without limitation, a wide area network, local area network, a wireless network, an Ethernet network, a cellular network, a high-speed backplane, a fiber-optic network using any type of protocol, and the like.

Example Use Case—Garbage Collection

A policy associated with a garbage collection (GC) administrative command can specify that when physical memory free space or storage (e.g. disks) free space is greater than a threshold value, then a GC task runs at low priority as a background task. The policy can further state that if physical memory free space or storage (e.g. disks) free space falls below a threshold value, then the GC task runs at a high priority. In another embodiment, a policy for a GC command can request a specified amount of, e.g., physical memory to run the GC command, but the policy also states that the GC command must yield resources to higher priority, critical, user work, in which case the GC task does not receive all of its requested resources.

Example Use Case—Check File System (CKFS)

An administrator of a storage appliance may occasionally check the health of a file system by running a "check file system" command to determine the integrity of the file system. CKFS can be a very long-running process, depending on the quantity of storage to check in the storage appliance, speed and number of processors, amount of user workload, and amount of memory in the storage appliance. The execution time of a CKFS command can be on the order of one or more days. To ensure that the CKFS does not too adversely affect daily work of users but still makes progress, an administrator can generate a policy associated with the CKFS command that allocates a medium amount of resources to the CKFS command during normal user workload hours and allocate more resources to the CKFS command during off-hours. In an embodiment, the administrator can determine that the CKFS command is not making enough progress, and the administrator can modify the policy to increase resource allocation to the already-executing CKFS command. The CKFS command can continue executing, detect the change in policy, and allocate resources to the CKFS command in accordance with the updated policy, without restarting the CKFS command. Since the CKFS command is an I/O-intensive process, an administrator may allocate more I/O queues to the CKFS command, and with a higher priority for reach queue.

Figure 2:
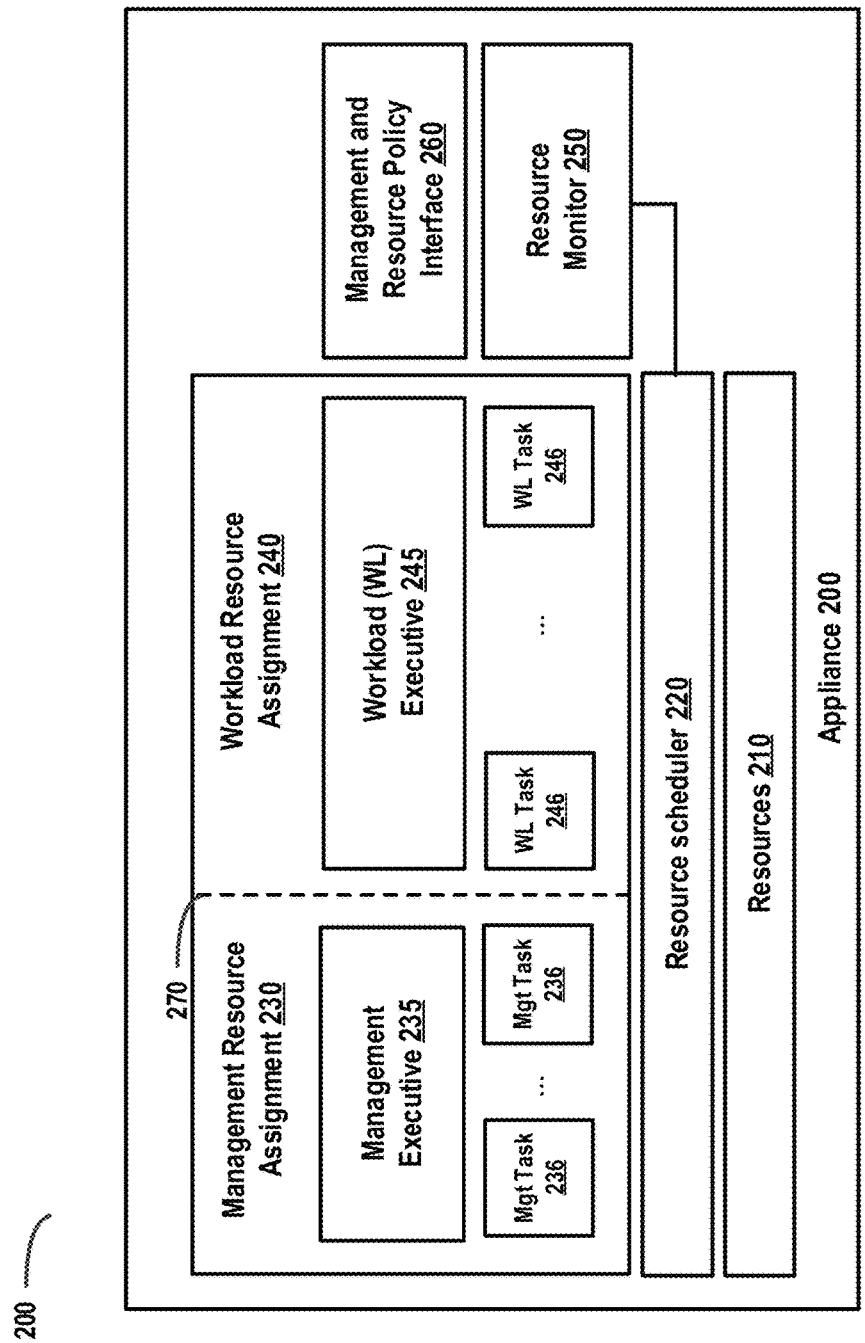
FIG. 2 illustrates, in block diagram form, a storage appliance that can implement administrative resource management QoS for storage appliances, in accordance with some embodiments.

FIG. 2 illustrates, in block diagram form, a storage appliance 200 that can implement administrative resource management QoS for storage appliances, in accordance with some embodiments.

Storage appliance 200 can be any type of storage device having computing resources 210 including one or more hardware processors, memory, network interfaces, storage controllers, and a large plurality of storage devices, often interconnected by a high-speed backplane or high speed bus. Storage appliance 200 can include hard disk drives, flash drives, and other types of storage devices. Examples of storage arrays include Dell® EMC® VMAX storage arrays, Dell® EMC® XtremIO storage arrays, and other storage arrays. Storage arrays can be implemented using a computing system as described below with reference to FIG. 7. In embodiment, underutilized computing hardware from the storage array can be provided by an embedded virtual machine container. Storage device 200 can further include a resource scheduler 220, management resource assignment 230, workload assignment 240, resource monitor 250, and management and resource policy interface (MRPI) 260.

Resource scheduler 220 can include one or more application programming interfaces (APIs) to implement allocation of resources as between management resources assignment 230 (administrative tasks) and workload resource assignment 240 (user tasks). A representative API is described below with reference to FIG. 6. Resource scheduler 220 can include one or more processor schedulers that can schedule administrative tasks and/or user tasks on a processor, including a processor quantum time for the task to execute before being swapped out, and a processor scheduling priority. Resource scheduler 220 can also allocate physical memory to one or more administrative tasks 236 and user tasks 246 that are executing. Resource scheduler 220 can also allocate, deallocate, assign, and/or reassign one or more I/O queues for network I/O, disk I/O, and other forms of input/output resources on appliance 200.

Management resource assignment 230 (administrative tasks) can include a management executive (ME) 235 that spawns, manages, and terminates one or more management tasks 236. Management tasks 236 can be initiated by an administrator using management and resource policy interface 260 to execute an administrative command. Management tasks 236 can also be generated in response to a triggering condition in a policy that is associated with an administrative task. For example, a check-file system (CKFS) administrative command may be manually entered by an administrator 140, or a garbage collection (GC) administrative command may be triggered automatically by a policy associated with the garbage collection command that requires garbage collection be performed when available memory, or storage, is lower than a specified threshold, such as 50 megabytes (50 MB).

Workload resource assignment 240 can include workload executive (WE) 245 and one or more workload tasks 246. Workload tasks 146 comprise user work; work that is the primary purpose of the storage appliance 200, such as reading and writing to storage, creating directories, renaming files, creating, modifying, or deleting files, etc. Dividing line 270 indicates that resource scheduler 220 can dynamically assign resources to either the management resources 230 or workload resources 240.

Resource monitor 250 is a light-weight monitoring process that monitors all resources, how much of each resource is allocated to management resources 230, and how much of each resource is allocated to workload resources 240. In an embodiment, resource monitor 250 can call one or more APIs to management executive 235 and workload executive 245 to determine how much of each resource is being used by individual management tasks 236 and workload tasks 246, respectively. In an embodiment, resource monitor 250 runs continuously.

Management resource policy interface (MRPI) 260 is an interface used by an administrator 140 to issue administrative commands, monitor the storage appliance 200, and create, up date, and/or delete one or more policies associated with one or more administrative commands, or groups of administrative commands. Groups of administrative commands can include "configuration," "health/diagnostic," and "performance" command groups. In an embodiment, a policy can be defined for a command group that includes a plurality of administrative commands. A base set of policies can be predefined by a manufacturer's engineers and shipped with the storage appliance 200. An administrator 140 can modify the base set of policies and/or add or delete policies as needed. Policies can be stored in a portion of the storage resources 210 of the storage appliance 200, just as any other data would be stored. In an embodiment, policies can be stored in a reserved area of memory in the storage appliance 200 such as a flash, battery backed memory, static memory, or other portion of memory.

Figure 3:
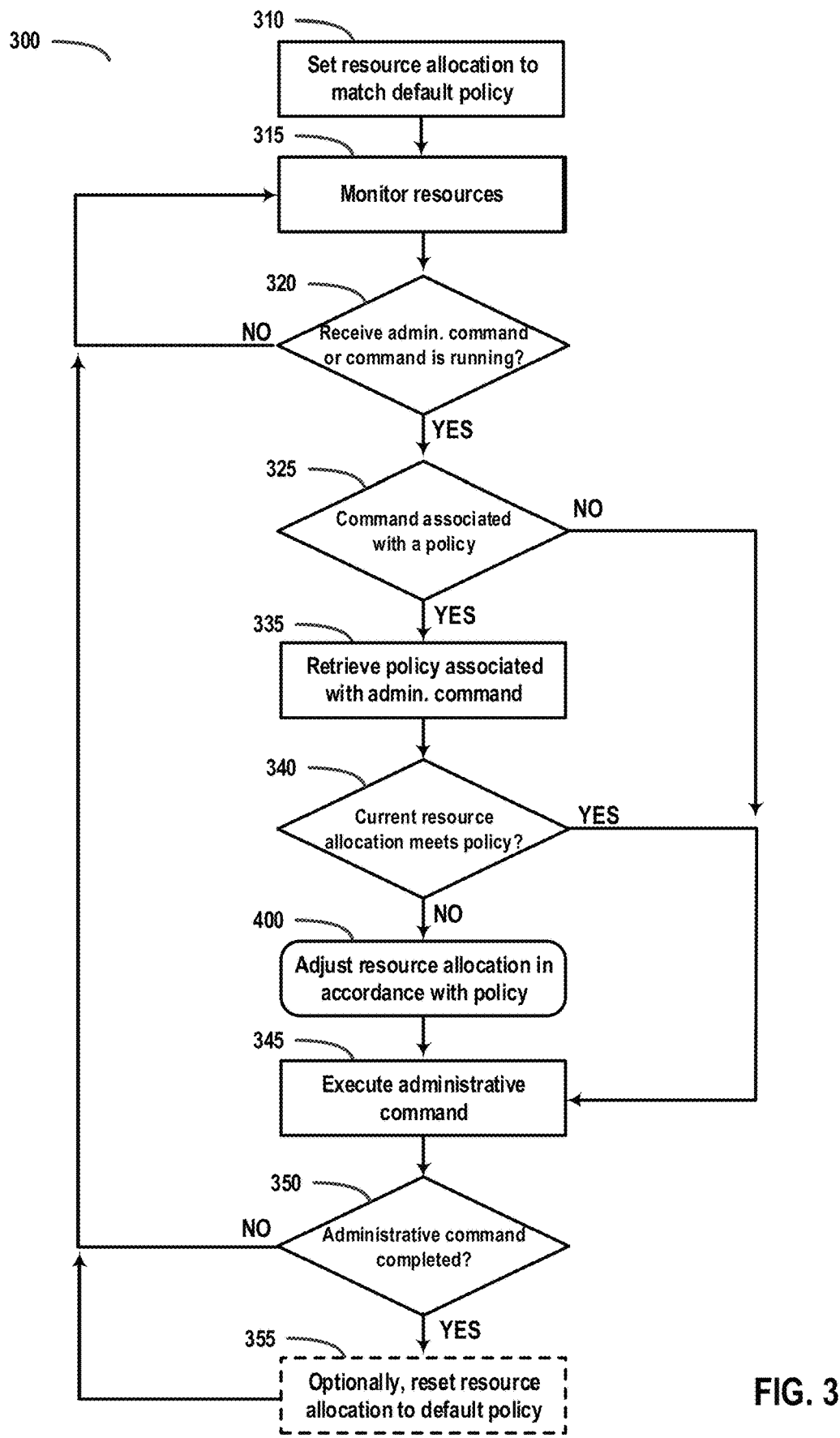
FIG. 3 illustrates in block diagram form, a method of implementing administrative resource management QoS on a storage appliance, in accordance with some embodiments.

FIG. 3 illustrates, in block diagram form, a method 300 of implementing administrative resource management QoS on a storage appliance, in accordance with some embodiments.

In operation 310, storage appliance 200 can initially set resource allocation policy to a default policy. A default policy can be shipped with the storage appliance 200, with attributes as defined by system engineers of a manufacturer of the storage appliance 200. In an embodiment, system administrator 140 can configure a default resource allocation policy as may be applicable to the facility, number of users, and other operating variables of the use of the storage appliance In an embodiment, a default policy can be as simple as allocating 90% of computing resources to user work and 10% of computing resources to administrative work. A default policy can alternatively be a policy with multiple sub-policies that implement certain administrative commands under conditions defined in the policy. Attributes of an example policy are described with reference to FIG. 5, below.

In operation 315, resource monitor 250 monitors usage of all system resources 210, including resources used by management task resources 236 and user work tasks 246.

In operation 320, it can be determined whether an administrative command has been received by the storage appliance 300. An administrative command can be received via manual entry of the administrative command via the MRPI 360, or by a policy associated with an administrative task having met a triggering condition of the policy that automatically initiates the administrative task. If an administrative task has not been received, then method 300 continues at operation 315. Otherwise an administrative command has been received and method 300 continues at operation 325.

In operation 325, it can be determined whether the received administrative command is associated with a policy. In an embodiment, operation 325 can alternatively include determining whether the administrative command is associated with a policy for a command group that includes the administrative command. If the administrative command is not associated with a policy, then method 300 continues at operation 345, where the administrative command will be executed using the default resource allocation policy of operation 310.

Otherwise, the received administrative command is associated with a resource allocation policy and method 300 continues at operation 335.

In operation 335, it has been determined that there is a policy associated with the received administrative command. The policy is retrieved and parsed.

In operation 340, it is determined whether the current resource allocations, as determined by resource monitor 220, and as indicated by management task resource allocation 230 and workload (user) task resource allocation 240, will meet the resource requirements for administrative command indicated in the policy. If the current resource management resource assignment 230 will meet the resource requirements for the administrative command indicated in the policy, then method 300 continues at 345. Otherwise method 300 continues at operation 400.

In operation 400, resource allocation is adjusted by resource schedule 220 in accordance with the policy associated with the administrative command. Operation 400 is described in detail below with reference to FIG. 4.

In operation 345, the administrative command is executed. An administrative command, for example, "check file system" (CKFS), may run for a lengthy time, such as one or more days. One or more of the process operations of method 300 may be re-executed during the execution of the administrative command, including monitoring resources, checking for an update to the policy used to execute the administrative command, and reallocating resources dynamically, during execution of the administrative command.

In operation 350, it can be determined whether the administrative task has completed. If not, then method 300 continues at operation 315, otherwise method 300 continues at operation 355.

In operation 355, it has been determined that the administrative command has completed and the resource allocation policy can, optionally, be reset to the default policy.

Figure 4:
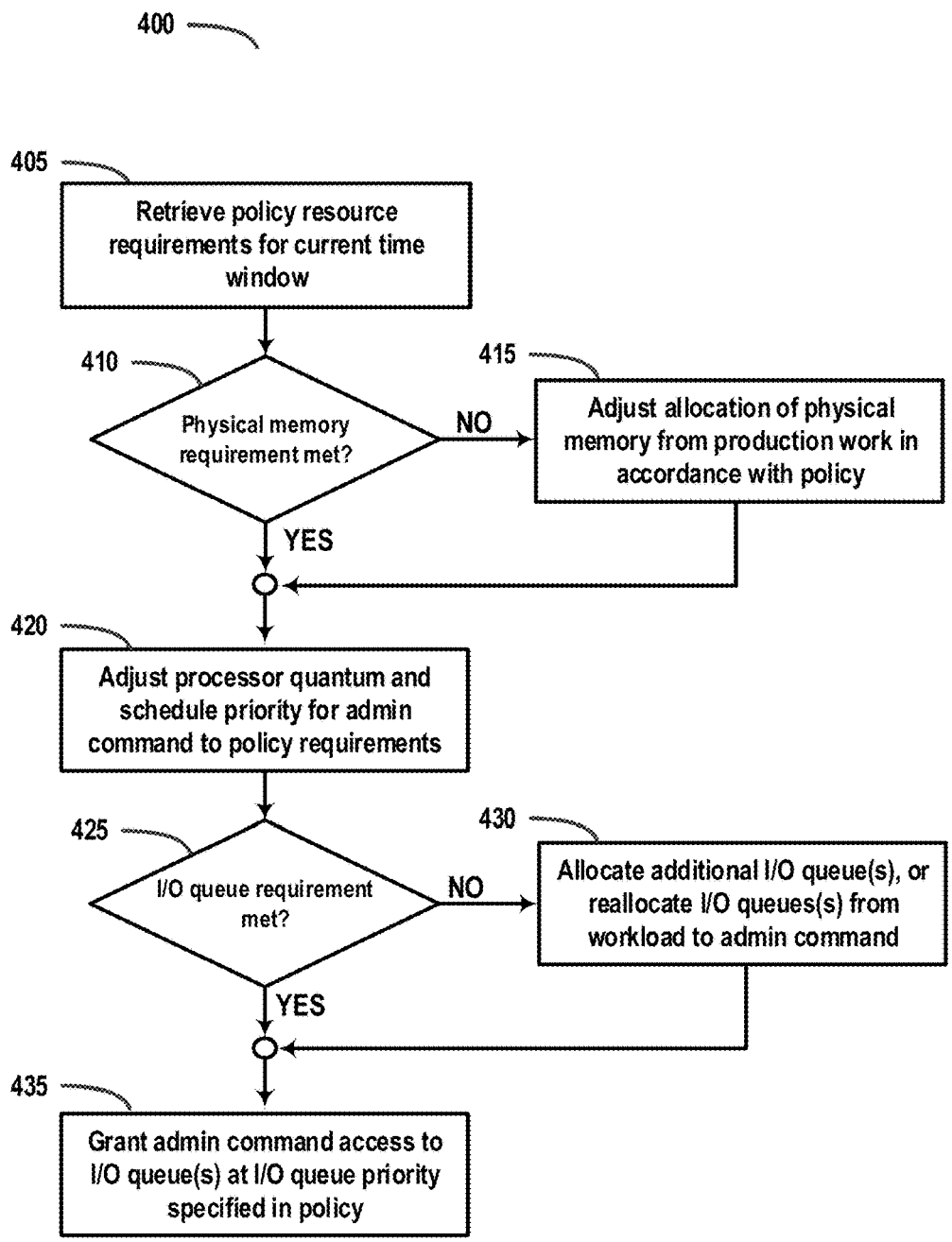
FIG. 4 illustrates, in block diagram form, a method of allocating resources on a storage appliance between administrative functions and production workload functions, in accordance with some embodiments.

FIG. 4 illustrates, in block diagram form, a method 400 of allocating resources on a storage appliance 200 between administrative functions 230 and production workload functions 240, in accordance with some embodiments. One of skill in the art will understand that any number and type of resources can be monitored by resource monitor 250 and reallocated by resource scheduler 220. Physical memory, CPU quantum and priority, and I/O queues are non-limiting examples of resources 210.

In operation 405, the policy may be re-retrieved to check a current time of the storage appliance 200 (real-world current time) against a possible sub-policy within the policy associated with the administrative command. For example, the administrative command may be "check file system" (CKFS) which can take one or more days to complete. A policy associated with the CKFS command may have a "day time" resource allocation sub-policy and a "night time" resource allocation sub-policy. Operation 405 will extract the appropriate resource requirements for the current window of time in the sub-policy, if any.

In operation 410, resource monitor 250 can determine whether an amount of physical memory requested by the policy to execute the administrative command is available. For example, a garbage collection policy may require 5 gigabytes (5 GB) of physical memory to execute to minimize pages swaps during garbage collection. If there is insufficient physical memory available to meet the request in the policy associated with the administrative command, then method 400 continues at operation 415. Otherwise method 400 continues at operation 420.

In operation 415, resource scheduler 220 can reallocate an amount of physical memory from workload resource assignment 240 (user work) to the management resource assignment 230 to execute the administrative command.

In operation 420, resource scheduler 220 can allocate processor quantum and scheduling priority to processing tasks of the administrative command in accordance with the policy. Allocating the requested processor quantum and scheduling priority to the administrative command processes may require resource scheduler 220 to call resource monitor 250 to determine an impact to workload resource assignment 240 for storage appliance 200 production work and determine whether the impact to production work is consistent with the policy associated with the administrative command.

In operation 425, it can be determined whether the I/O requirements for the administrative command can be met with available resources. I/O requirements can include a number of I/O queues, a priority of the I/Os of the administrative tasks in the I/O queues, and the like. If the I/O requirements for the administrative command are not met, then method 400 continues operation 430, otherwise method 400 continues at operation 435.

In operation 430, resource scheduler 220 can allocate additional I/O queue(s), or reallocate I/O queue(s) from workload resource assignment 240 to management resource assignment 230. Such reallocation may impact processing of workload task(s) 246. Resource schedule 220 can determine whether such impact is consistent with the policy associated with the administrative command.

In operation 435, resource scheduler 220 can grant the administrative command processes access to the I/O queue(s) at the I/O queue(s) priority in accordance with the policy associated with the administrative task.

FIG. 5 illustrates, in block diagram form, an example policy 500 for implementing administrative resource management QoS on a storage appliance, in accordance with some embodiments. FIG. 5 is described with reference to the administrative command "check file system" (CKFS) 501 as a non-limiting example. One of skill in the can add or delete attributes from the example policy consistent with this disclosure.

A policy can have a plurality of attributes 501 through 585. Policy attributes can include an administrative command 501 associated with the policy 500, a quality of service 502, an administrative command group 503, a list 504 of administrative commands in the group, a trigger for invoking the command 505, a policy change trigger 506, and a completion requirement 507. In addition, using the example of the CKFS command, policy 500 can have sub-policy A 510 of the CKFS command, and sub-policy B 550 of the CKFS command.

Command 501 can be any administrative command such as configuring (CFG) a portion of the storage device 200 to provision storage for a user, migrate a virtual machine from one storage appliance 200 to another, check file system (CKFS), garbage collection (GC), perform read/write check on one or more tracks or sectors of a storage device in the storage appliance 200, etc.

Quality of service 502 can be an ordinal number indicating a relative quality of service for the command. For example, a configuration command may have a low QoS such as 1 or 2, a garbage collection command may have a medium quality of service such as 3, and a health-check command such as CKFS may have a high priority such as 5.

A command or policy may be associated with a group 503, such as "configuration commands," "health/diagnostic" commands, or "performance tuning" commands. A list of commands 504 belonging to the group can be associated with the policy. If an administrative command is triggered (manual entry by administrator or by condition in a policy), and the command is listed in a command group 504, then the policy is applied and the administrative command is triggered.

In an embodiment, a different sub-policy 510 or 550 may be triggered based on a condition. For example, a long-running command such as CKFS may have a sub-policy A 510 or sub-policy B 550 that is triggered based on a time window attribute 515 or 555 in the sub-policy. A command may also have a specified completion target time, such as complete within 24 hours.

A sub-policy, e.g. sub-policy A, can have a description 510, a time window 515 for applying the policy, an amount of physical memory 520 needed for executing the administrative command, a processor quantum and priority 525, and a number of I/O queue(s) and I/O queue priority 530 for executing the administrative command. In an embodiment, sub-policy A 510 can also indicate criteria 535 for deferring resource reallocation policy in view of higher priority workload tasks 246. Sub-policy A can also list 540 production work for which the administrative task 236 will take priority over the workload tasks 246. Sub-policy B can have analogous, or different, policy attributes. A policy can have any number of sub-policies.

Figure 6:
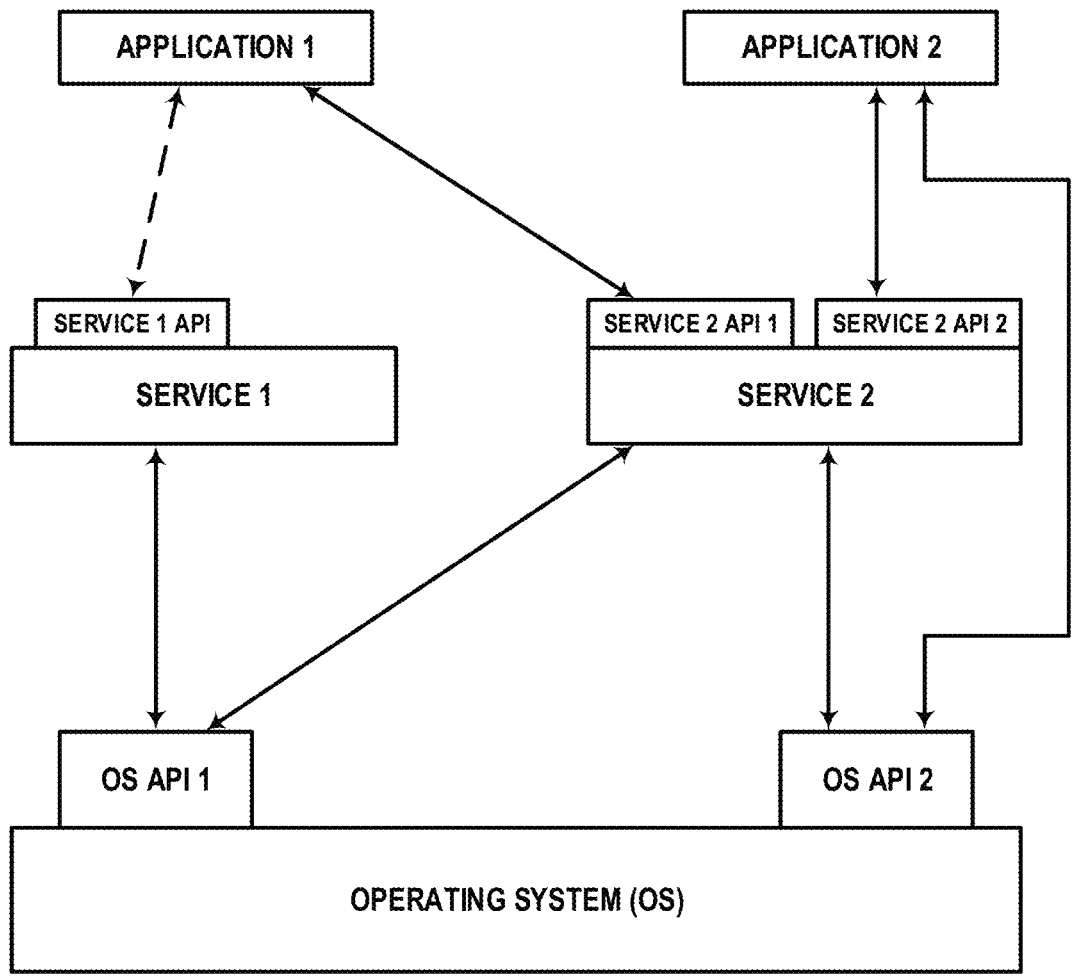
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
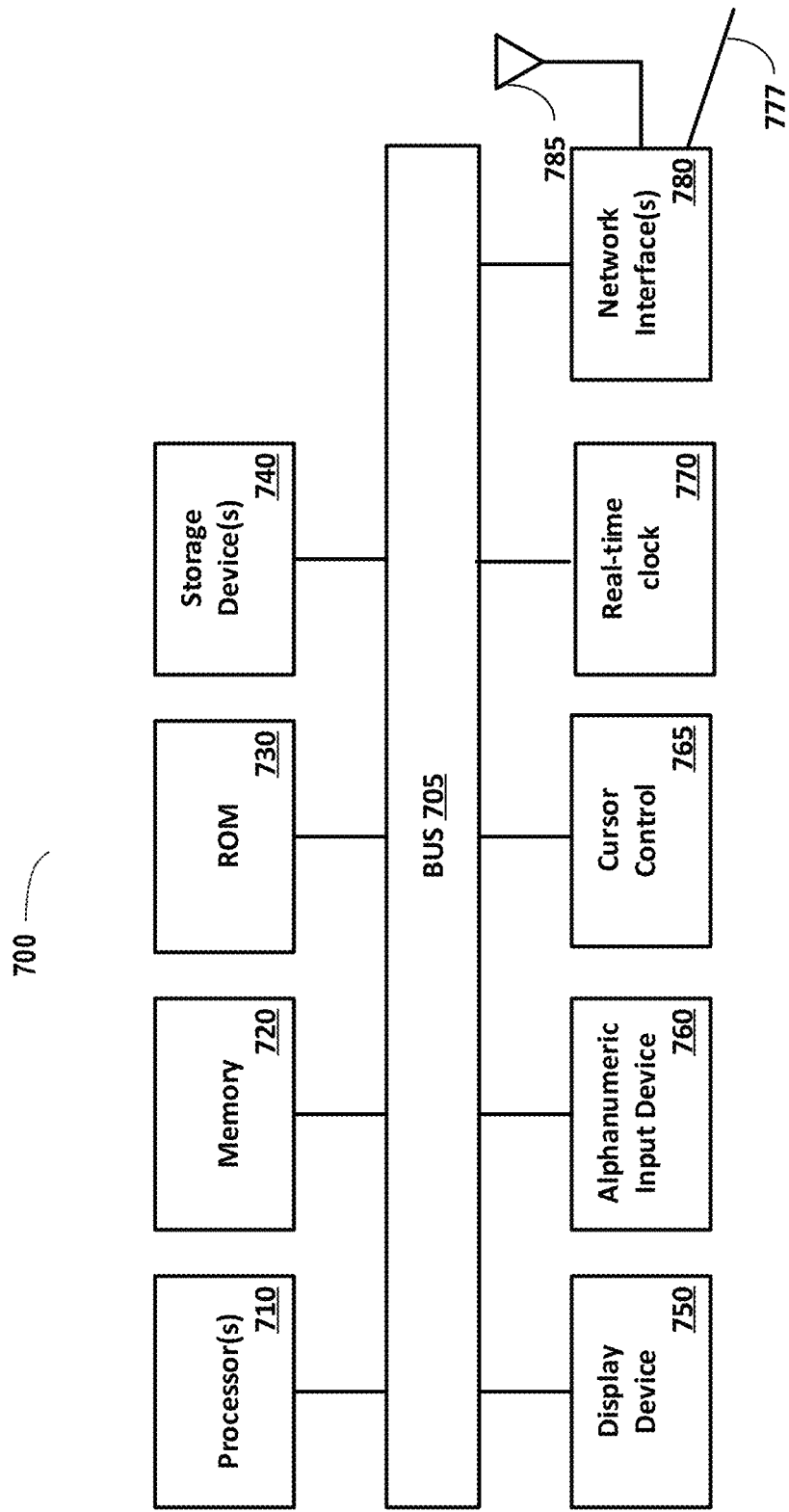
FIG. 7 illustrates, in block diagram form, an exemplary computing system for implementing concepts described herein.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device, a server device, or a storage appliance.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), touch screen display, or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chip set with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of Wi-Fi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 880 may provide wireless communications using for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. Certain embodiments above have been described with reference to specified node numbers. The inventive concepts described herein can be implemented on any number of nodes. It will be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
    receiving a command to perform an administrative task on a storage appliance of a computing system;
    monitoring, by a resource monitor, resources used by a plurality of work tasks;
    retrieving, from memory of the storage appliance, a predefined policy associated with the administrative task that has a plurality of sub-policies, each sub-policy specifies a different allocation of resources for executing the administrative task with respect to the other sub-policies of the plurality of sub-policies;
    selecting a sub-policy of the plurality of sub-policies that specifies a first quantity of resources for executing the administrative task;
    determining that there are insufficient available resources for executing the administrative task according to the first quantity of resources specified by the selected sub-policy;
    dynamically reallocating one or more resources from a work task that is currently being executed in the plurality of work tasks to the administrative task to meet the first quantity of resources required for the administrative task;
    executing the administrative task using resources that include the one or more reallocated resources while the work task continues to be executed using less resources;
    determining, while the administrative task is executing, that a required completion time for the administrative task is less than a previous completion time for which the administrative task was previously completed,
    estimating a second quantity of resources required for completing the administrative task by the required completion time, based on the required completion time, the previous completion time, and a quantity of resources previously used to complete the administrative task;
    producing an updated policy with an updated version of the sub-policy that specifies the second quantity of resources for executing the administrative task; and
    dynamically reallocating one or more additional resources from at least one work task of the plurality of work tasks to the administrative task to meet the second quantity of resources required for the administrative task.

2. The method of claim 1, wherein the work task includes reading or writing data to the storage appliance.

3. The method of claim 1, wherein the sub-policy is selected in response to determining that a triggering condition is met.

4. The method of claim 3, wherein each sub-policy is associated with a different window of time, wherein the trigger condition is determining that a current time of the computing system falls within a window of time of the sub-policy.

5. The method of claim 1, wherein each sub-policy specifies, for different times of day, at least a time window for applying the sub-policy, an amount of physical memory needed for executing the administrative task, a processor quantum and priority, a number of input/output ("I/O") queue(s) and I/O queue priority.

6. The method of claim 1,
    wherein the command is received from an administrator of the storage appliance and the administrative task is one of 1) a configuration function for configuring the storage appliance of the computing system for use by a user and 2) a diagnostic function for determining health and reliability of the storage appliance, and
    wherein the plurality of work tasks are being executed in response to one or more user commands of one or more users of the storage appliance and the plurality of work tasks include reading data from the storage appliance and writing data to the storage appliance.

7. The method of claim 1, further comprising:
    in response to determining that the policy indicates that executing of the work task is a higher priority than executing the administrative task, allocating only as much of the resource to the administrative task as is available to administrative task, regardless of a required quantity of the resource specified in the policy.

8. A non-transitory computer-readable medium programmed with executable instructions that, when executed by a computing system having at least one hardware processor, perform operations comprising:
    receiving a command to perform an administrative task on a storage appliance of the computing system;

monitoring, by a resource monitor, resources used by a plurality of work tasks;
retrieving, from memory of the storage appliance, a predefined policy associated with the administrative task that has a plurality of sub-policies, each sub-policy specifies a different allocation of resources for executing the administrative task with respect to the other sub-policies of the plurality of sub-policies;
selecting a sub-policy of the plurality of sub-policies that specifies a first quantity of resources for executing the administrative task;
determining that there are insufficient available resources for executing the administrative task according to the first quantity of resources specified by the selected sub-policy;
dynamically reallocating one or more resources from a work task that is currently being executed in the plurality of work tasks to the administrative task to meet the first quantity of resources required for the administrative task;
executing the administrative task using resources that include the one or more reallocated resources while the work task continues to be executed using less resources;
determining, while the administrative task is executing, that a required completion time for the administrative task is less than a previous completion time for which the administrative task was previously completed;
estimating a second quantity of resources required for completing the administrative task by the required completion time, based on the required completion time, the previous completion time, and a quantity of resources previously used to complete the administrative task;
producing an updated policy with an updated version of the sub-policy that specifies the second quantity of resources for executing the administrative task; and
dynamically reallocating one or more additional resources from at least one work task of the plurality of work tasks to the administrative task to meet the second quantity of resources required for the administrative task.

9. The medium of claim 8, wherein the work task includes reading or writing data to the storage appliance.

10. The medium of claim 8, wherein the sub-policy is selected in response to determining that a triggering condition is met.

11. The medium of claim 10, wherein each sub-policy is associated with a different window of time, wherein the triggering condition is determining that a current time of the computing system falls within a window of time of the sub-policy.

12. The medium of claim 8, wherein the each sub-policy specifies, for different times of day, at least a time window for applying the sub-policy, an amount of physical memory needed for executing the administrative task, a processor quantum and prioirty, a number of input/output ("I/O") queue(s) queue priority.

13. The medium of claim 8,
wherein the command is received from an administrator of the storage appliance and the administrative task is one of 1) a configuration function for configuring the storage appliance of the computing system for use by a user and 2) a diagnostic function for determining health and reliability of the storage appliance, and
wherein the plurality of work tasks are being executed in response to one or more user commands of one or more users of the storage appliance and the plurality of work tasks include reading data from the storage appliance and writing data to the storage appliance.

14. The medium of claim 8, further comprising:
in response to determining that the policy indicates that executing of the work task is a higher priority than executing the administrative task, allocating only as much of the resource to the administrative task as is available to administrative task, regardless of a required quantity of the resource specified in the policy.

15. A computing system comprising:
a storage appliance having at least one hardware processor, the storage appliance coupled to a memory programmed with executable instructions that, when executed by the storage appliance, perform operations comprising:
receiving a command to perform an administrative task on the storage appliance;
monitoring, by a resource monitor, resources used by a plurality of work tasks;
retrieving, from the memory, a predefined policy associated with the administrative task that has a plurality of sub-policies, each sub-policy specifies a different allocation of resources for executing the administrative task with respect to the other sub-policies of the plurality of sub-policies;
selecting a sub-policy of the plurality of sub-policies that specifies a first quantity of resources for executing the administrative task;
determining that there are insufficient available resources for executing the administrative task according to the first quantity of resources specified by the selected sub-policy;
dynamically reallocating one or more resources from a work task that is currently being executed in the plurality of work tasks to the administrative task to meet the first quantity of resources required for the administrative task;
executing the administrative task using resources that include the one or more reallocated resources while the work task continues to be executed using less resources;
determining, while the administrative task is executing, that a required completion time for the administrative task is less than a previous completion time for which the administrative task was previously completed;
estimating a second quantity of resources required for completing the administrative task by the required completion time, based on the required completion time, the previous completion time, and a quantity of resources previously used to complete the administrative task;
producing an updated policy with an updated version of the sub-policy that specifies the second quantity of resources for executing the administrative task; and
dynamically reallocating one or more additional resources from at least one work task of the plurality of work tasks to the administrative task to meet the second quantity of resources required for the administrative task.

16. The system of claim 15, wherein the work task includes reading or writing data to the storage appliance.

17. The system of claim 15, wherein the sub-policy is selected in response to determining that a triggering condition is met.

18. The system of claim 17, wherein each sub-policy is associated with a different window of time, wherein the trigger condition is determining that a current time of the computing system falls within a window of time of the sub-policy.

19. The system of claim 15, wherein the each sub-policy specifies, for different times of day, at least a time window for applying the sub-policy, an amount of physical memory needed for the executing the administrative task, a processor quantum and priority, a number of input/output ("I/O") queue(s) and I/O queue priority.

20. The system of claim 15,
   wherein the command is received from an administrator of the storage appliance and the administrative task is one of 1) a configuration function for configuring the storage appliance of the computing system for use by a user and 2) a diagnostic function for determining health and reliability of the storage appliance, and
   wherein the plurality of work tasks are being executed in response to one or more user commands of one or more users of the storage appliance and the plurality of work tasks include reading data from the storage appliance and writing data to the storage appliance.

21. The system of claim 15, further comprising:
   in response to determining that the policy indicates that executing of the work task is a higher priority than executing the administrative task, allocating only as much of the resource to the administrative task as is available to administrative task, regardless of a required quantity of the resource specified in the policy.

* * * * *

UNITED STATES PATENT AND TRADEMARK OFFICE
CERTIFICATE OF CORRECTION

PATENT NO. : 11,188,387 B2
APPLICATION NO. : 15/965298
DATED : November 30, 2021
INVENTOR(S) : Stephen D. Smaldone, Ian Wigmore and Arieh Don It is certified that error appears in the above-identified patent and that said Letters Patent is hereby corrected as shown below:

In the Claims

In Claim 12, Column 13, Line 53, delete "wherein the each" and insert --wherein each--.

In Claim 12, Column 13, Line 54, delete "times of day, at least a time" and insert --times of day, at least at least a time--.

In Claim 12, Column 13, Line 57, delete "prioirty" and insert --priority--.

In Claim 12, Column 13, Line 58, delete "queue(s) queue priority" and insert --queue(s) I/O queue priority--.

Signed and Sealed this
Fifth Day of September, 2023

Katherine Kelly Vidal
*Director of the United States Patent and Trademark Office*